United States Patent [19]

Blurton

[11] 4,263,376
[45] Apr. 21, 1981

[54] FUEL CELL ELECTRODE

[75] Inventor: Keith F. Blurton, Hinsdale, Ill.

[73] Assignee: Institute of Gas Technology, Chicago, Ill.

[21] Appl. No.: 118,507

[22] Filed: Feb. 4, 1980

[51] Int. Cl.$^3$ .............................................. H01M 4/86
[52] U.S. Cl. ..................................... 429/42; 427/115; 252/182.1
[58] Field of Search ................................... 429/40–45; 427/115, 125; 252/182.1

[56] References Cited

U.S. PATENT DOCUMENTS

| | | | |
|---|---|---|---|
| 3,405,007 | 10/1968 | Waters | 429/42 |
| 3,530,004 | 9/1970 | Coffield | 429/40 X |
| 3,977,901 | 8/1976 | Buzzelli | 429/40 |
| 4,166,143 | 8/1979 | Petrow et al. | 429/42 X |

*Primary Examiner*—Charles F. LeFevour
*Attorney, Agent, or Firm*—Thomas W. Speckman

[57] ABSTRACT

A supported electrocatalyst for use in fuel cell electrodes wherein support carbon particles have nitrogen containing groups chemically bonded to their surface and a high surface area electrocatalyst metal or alloy thereof supported thereon, the nitrogen containing groups providing force interaction between the nitrogen containing groups and the electrocatalyst metal or alloy. Fuel cell electrodes, particularly gas diffusion electrodes, having the above described supported electrocatalyst therein. A process for production of a fuel cell electrode having the above described supported electrocatalyst. Especially preferred are amide groups chemically bonded to the carbon particles supporting a platinum catalyst and fabricated into a diffusion electrode for use in a phosphoric acid fuel cell. The fuel cell electrodes of the invention maintain high electrocatalyst surface area during fuel cell operation and thus maintain stability during extended times of fuel cell operation.

18 Claims, No Drawings

FUEL CELL ELECTRODE

BACKGROUND OF THE INVENTION

1. Field of the Invention

This invention relates to fuel cell electrodes of the type comprising porous carbon with high surface area metal or alloy thereof supported thereon. Such electrodes have been commonly used as diffusion electrodes in low temperature fuel cells which operate at temperatures from ambient to about 200° or 300° C.

Such fuel cells provide oxidation of an externally supplied fuel at the anode making electrons available for flow in an external circuit. The oxidation of the fuel results in production or neutralization of ions at the anode which pass through the electrolyte to or from the cathode where they are neutralized or created by oxygen and electrons. Many fuel cells utilize diffusion electrodes permitting fuel gas or oxygen or air to diffuse into the interior of the pores of the electrode from one side, while the electrolyte penetrates the pores from the other side. The chemical and catalytic action takes place at the interface between the electrolyte, the reacting gas and the electrode. The stability of the electrode and its associated catalyst is an important aspect in the successful and practical operation of a fuel cell. The present invention provides stabilization of such catalysts during operation of fuel cells of the type having at least one electrode comprising porous carbon with high surface area metal or alloy thereof supported thereon.

2. Description of the Prior Art

Typical fuel cells are well known in the art and are generally described in a number of references such as "Fuel Cells," D. P. Gregory, M & B Monograph CE/7, Mills & Boon Limited, London (1972) and "Handbook of Fuel Cell Techology," Carl Berger, editor, Prentice-Hall, Inc., Englewood Cliffs, N.J. (1968).

Fuel cell electrodes of the type having porous carbon with high surface area metal or alloys thereof supported thereon have been known in the art as exemplified by U.S. Pat. No. 3,857,737 relating to a noble metal catalyst such as platinum deposited on particles of an inert carrier such as carbon. The catalytic activity of platinum supported on carbon fabricated into Teflon-bonded diffusion electrodes for phosphoric acid fuel cells has been known as exemplified by "The Catalytic Activity of Platinum Supported on Carbon for Electrochemical Oxygen Reduction in Phosphoric Acid," H. R. Kunz and G. A. Gruver, Journal of the Electrochemical Society, Vol. 122, No. 10, pp 1279–1287 (1975).

The prior art has recognized the desirability of stability of the electrocatalysts during extended periods of fuel cell operation. One attempt to obtain such stability is described in U.S. Pat. No. 4,090,978 teaching use of carbonaceous pyropolymers in the preparation of an electrocatalyst.

SUMMARY OF THE INVENTION

This invention relates to a fuel cell electrode of the type comprising porous carbon with high surface area metal or alloy thereof supported on the carbon, wherein nitrogen containing groups affixed to the surface of the carbon provide force interaction between the nitrogen containing groups and the metal thereby improving maintenance of high metal surface area during operation of the fuel cell. The invention provides a process for production of improved fuel cell electrodes by the process of forming nitrogen containing groups on the surface of particles of carbon, catalyzing the carbon particles by application of a catalytically active metal, mixing the catalyzed particles of carbon with a polytetrafluoroethylene suspension and applying the catalyzed carbon containing suspension to a current collector. Such electrodes are suitable for use as gaseous diffusion electrodes in low temperature fuel cells utilizing an aqueous or ion exchange membrane electrolyte. One specific embodiment of the invention relates to utilization of electrodes of this invention in phosphoric acid fuel cells wherein the nitrogen containing groups are amides and the electrocatalyst metal is platinum or an alloy thereof.

It is one object of this invention to provide an improved electrocatalyst and support.

It is an object of this invention to provide fuel cell electrodes providing improved stability of an electrocatalyst during fuel cell operation.

It is another object of this invention to provide fuel cell electrodes wherein nitrogen containing groups are fixed to the surface of a carbon support and provide force interaction between the nitrogen containing groups and the electrocatalyst metal during operation of the fuel cell.

It is an object of this invention to maintain high surface area of electrocatalyst metals on carbon supports during fuel cell operation and thus maintain high performance of the fuel cell during extended times of operation.

DESCRIPTION OF THE PREFERRED EMBODIMENTS

This invention utilizes any suitable carbonaceous support material known to the art for support of an electrocatalyst metal in fuel cell electrodes. Specifically, powdered carbon, including graphite, is suitable for use in this invention. The term "carbon" as used throughout this description and in the appended claims is meant to include all such carbonaceous materials. The carbon particles suitable for use in this invention are less than about 5 microns in diameter and preferably less than about 1 micron in diameter. The essential feature of the carbon is that it provide a large surface area and be susceptible to the affixing of nitrogen containing groups to the surface of the carbon particles. Suitable nitrogen containing groups are selected from the group consisting of amides, amines and nitriles. The nitrogen containing groups may be affixed on the surface of the carbon particles by methods known to the art, such as, oxidizing the surface of the particles of carbon to form surface carboxyl groups (—COOH). Oxidation may be achieved by any suitable oxidizing agent, such as nitric acid, chromic acid and sulphuric acid. The surface carboxyl groups are then neutralized with ammonium hydroxide or a substituted ammonium hydroxide, such as with methyl, ethyl groups, to form the ammonium salt of the carboxyl radicals. The nitrogen containing salt of the carboxyl groups is then heat treated in an inert gas forming the amide nitrogen containing groups on the surface of the carbon particles. This may be done by heating in a nitrogen or other inert atmosphere to temperatures in the order of 500° C. The amide groups are thus chemically bound to the carbon particles. The amide containing carbon particles may then be used as the catalyst support, or the amide groups may be converted into amine or nitrile groups. The amine groups may be formed by treating the amide groups with bromine in aqueous caustic soda solution, and the nitrile groups may be formed by dehydrating the amide groups with, for example, concentrated sulfuric acid. The nitrogen containing groups, which may be amides, amines and nitriles and mixtures thereof on the surface of the carbon particles are thus chemically bound to the carbon particles.

The pretreated carbon particles are then made catalytically active for fuel cell application by supporting high surface area electrocatalyst metal or alloy thereof on the surface of the pretreated carbon particles. The nitrogen containing groups affixed to the surface of the carbon particles provide force interaction, such as van der Waal's forces, between the nitrogen containing groups and the electrocatalyst metal. These forces improve maintenance of high metal surface area of the electrocatalyst during operation of the fuel cell. Suitable electrocatalytically active metals are well known in the art and examples include platinum, palladium, gold, ruthenium, rhodium, silver and alloys thereof including alloys of noble metals and non-noble metals, particularly platinum and rhenium, platinum and ruthenium, platinum and tungsten, platinum and nickel, platinum and rhodium, palladium and tungsten, palladium and nickel, palladium and ruthenium, palladium and lead, palladium and germanium, platinum-lead-bismuth, as representative alloys. Any suitable catalytically active metal or alloy may be used and the above list is only representative of the type of electrocatalyst metal suitable and is not meant to limit the present invention in any way. The electrocatalyst metal having a surface area of about 80 to 150 $m^2/gm$ may be applied to the carbon support by stirring the carbon powder support with nitrogen containing groups on the surface in an aqueous solution of the electrocatalyst metal such as solutions of chloroplatinic acid, chloroplatinous acid, bromoplatinic acid, diammonium platinum dinitrite, tetraammonium platinum dinitrite, as well as corresponding solutions of palladium and mixtures of platinum and rhenium, platinum and rhodium, platinum and germanium, platinum and tin, palladium and rhodium, palladium and rhenium, palladium and tin, and the like. The solvent may be removed by heating at a temperature sufficient to evaporate the solvent, and the metal salt is then reduced by heating in hydrogen to a temperature of about 500° C. to produce the metal or alloys on the surface of the pretreated carbon particles. The catalyzed particles of carbon contain the catalytic metal with loading in the range of about 2 to about 20 wt. percent, preferably about 5 to 10 wt. percent.

The catalyzed carbon may then be fabricated into a fuel cell electrode by any manner known in the art, normally by mixing with a support material such as polytetrafluoroethylene. The catalyzed carbon and powder of polytetrafluoroethylene may be suspended in a suitable solvent, such as water or alcohol, and deposited in any known manner on a suitable substrate. This may be done by screen printing, spraying, filter transfer process on a tantalum screen or porous graphite or carbon paper current collector which is then dried and sintered at an elevated temperature of about 250° to 350° C. There are, as will be apparent to one skilled in the art upon reading of this disclosure, other manners of preparing the desired electrode.

The electrodes prepared in this fashion are suitable for use in aqueous electrolyte and ion exchange membrane electrolyte fuel cells. Ion exchange membrane electrolytes are more fully described in the chapter "The Ion Exchange Membrane Fuel Cell," H. J. R. Maget, Handbook of Fuel Cell Technology (Ibid). Suitable acid or alkaline aqueous electrolytes as well known in the fuel cell art may be used.

Various physical configurations of fuel cells are well known in the art and many different configurations may be used in fuel cells embodying the features of the present invention. Fuel cells containing at least one electrode embodying the features of this invention will provide greater output stability than the prior fuel cells wherein the electrocatalyst metal is placed directly on the porous carbon without nitrogen containing groups on the surface of the carbon particles. The nitrogen containing groups on the surface of the carbon particle will aid in prevention of sintering of the electrocatalyst during fuel cell operation and the concomitant loss of electrocatalyst surface area with the subsequent loss of cell performance. Phosphoric acid fuel cells having diffusion electrodes, as well known in the art, are particulary suited for the improved electrode of the present invention.

The following example is given for the purpose of illustrating one preferred embodiment in the preparation of fuel cell electrodes according to the teachers of this invention and is not meant to limit the invention in any manner.

EXAMPLE

Carbon powder sold under the same Vulcan XC-72 by Cabot Corporation having nitrogen BET surface area of about 220 $m^2/gm$ is stirred in 50% nitric acid oxidizing a substantial number of surface carbon atoms to form carboxyl radicals (—COOH). The nitric acid is drained from the carbon powder and the carbon powder is then stirred in strong ammonium hydroxide neutralizing the carboxyl radicals forming the ammonium salt of the carboxyl radical. The carbon powder is dried at 110° C. in a nitrogen stream and then heated to 500° C. in a nitrogen atmosphere to form amide groups on the surface of the carbon particles.

The carbon powder support with amide groups on the surface of the carbon particles is catalyzed with platinum by stirring it in a solution of chloroplatinic acid, evaporating to dryness, and reducing the platinum salt by heating in a hydrogen atmosphere at 400° C.

The catalyzed carbon support is fabricated into a Teflon-bonded diffusion electrode by mixing the catalyzed support with Teflon-30 (E. I. duPont de Nemours & Company) suspension, applying the mixture to a carbon paper current collector, drying and then sintering in a nitrogen atmosphere at 300° C. The electrodes contain about 0.5 mg $Pt/cm^2$ and a typical active catalyst surface area of about 100 $m^2/gm$ is obtained.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a fuel cell electrode of the type comprising porous carbon with high surface area electrocatalyst metal or alloy thereof supported thereon; the improvement comprising nitrogen containing groups affixed to the surface of said carbon providing force interaction between said nitrogen containing groups and said metal improving maintenance of high metal surface area during operation of said fuel cell.

2. The fuel cell electrode of claim 1 wherein said nitrogen containing groups are selected from the group consisting of amides, amines and nitriles.

3. The fuel cell eletrode of claim 2 wherein said nitrogen containing groups are amides.

4. The fuel cell electrode of claim 3 wherein said metal is platinum.

5. The fuel cell electrode of claim 1 wherein said metal is selected from the group consisting of platinum, palladium, ruthenium, rhodium, gold and silver.

6. The fuel cell electrode of claim 5 wherein said metal is platinum.

7. A fuel cell electrode comprising; a metal current collector, polytetrafluoroethylene bonding active high surface area electrocatalyst metal supported on carbon to said current collector wherein said carbon has nitrogen containing groups in surface positions providing force interaction between said nitrogen containing groups and said active metal improving maintenance of high active metal surface area under fuel cell operating conditions.

8. The fuel cell electrode of claim 7 wherein said nitrogen containing groups are selected from the group consisting of amides, amines and nitriles.

9. The fuel cell electrode of claim 8 wherein said nitrogen containing groups are amides.

10. The fuel cell electrode of claim 9 wherein said metal is platinum.

11. The fuel cell electrode of claim 7 wherein said metal is selected from the group consisting of platinum, palladium, ruthenium, rhodium, gold and silver.

12. The fuel cell electrode of claim 11 wherein said metal is platinum.

13. In a fuel cell of the type comprising an electrode comprising porous carbon with high surface area electrocatalyst metal or alloy thereof supported thereon, an aqueous or ion exchange membrane electrolyte and gaseous reactant, the improvement comprising nitrogen containing groups affixed to the surface of said carbon providing force interaction between said nitrogen containing groups and said metal improving maintenance of high metal surface area during operation of said fuel cell.

14. The fuel cell of claim 13 wherein said nitrogen containing groups are selected from the group consisting of amides, amines and nitriles.

15. The fuel cell of claim 14 wherein said nitrogen containing groups are amides.

16. The fuel cell of claim 15 wherein said metal is platinum.

17. The fuel cell of claim 13 wherein said metal is selected from the group consisting of platinum, palladium, ruthenium, rhodium, gold and silver.

18. The fuel cell of claim 13 wherein said metal is platinum.

* * * * *